June 20, 1939.  D. R. MATTOON  2,162,961
COOKING UTENSIL HANDLE
Filed Oct. 6, 1936  2 Sheets-Sheet 1
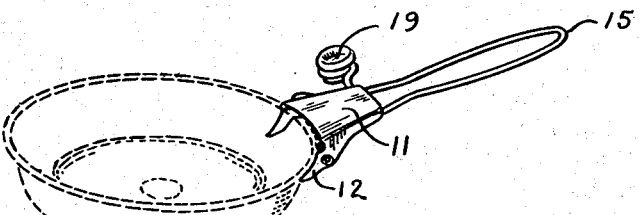
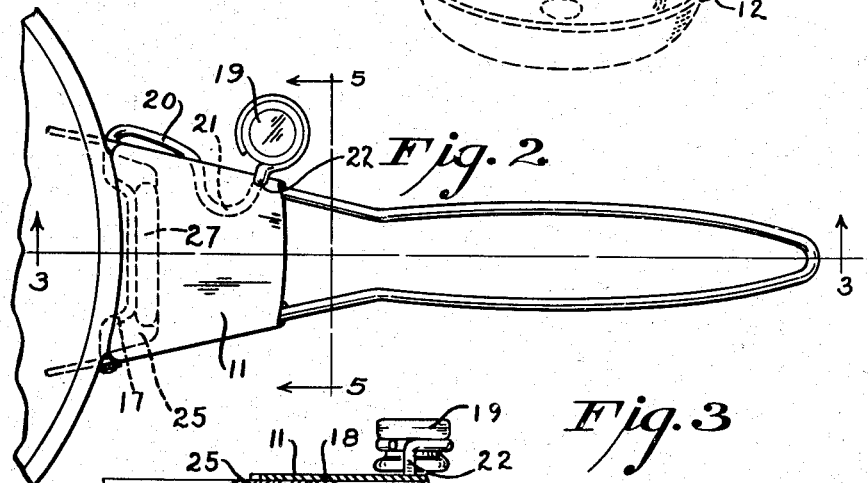
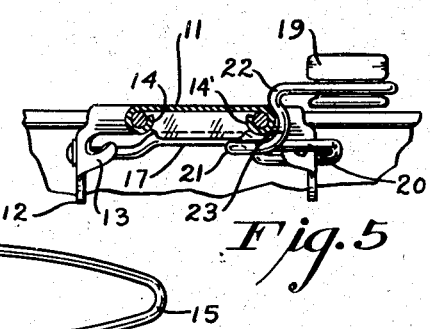
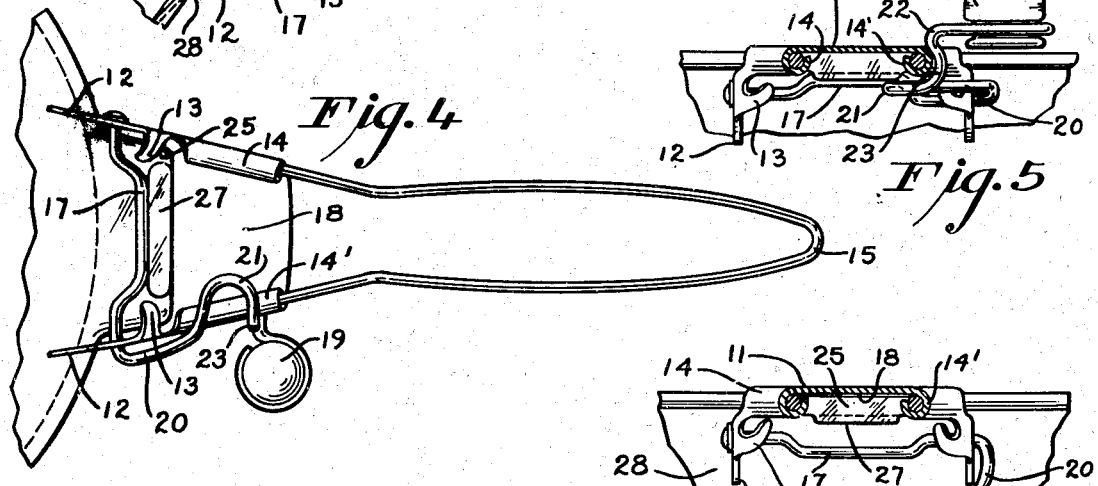
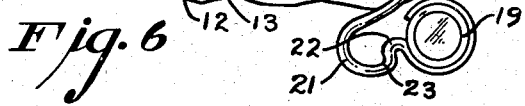
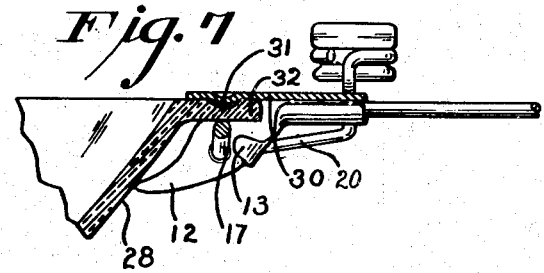
INVENTOR.
DEO R. MATTOON
BY Dorsey & Cole
ATTORNEYS.

June 20, 1939.  D. R. MATTOON  2,162,961
COOKING UTENSIL HANDLE
Filed Oct. 6, 1936  2 Sheets-Sheet 2
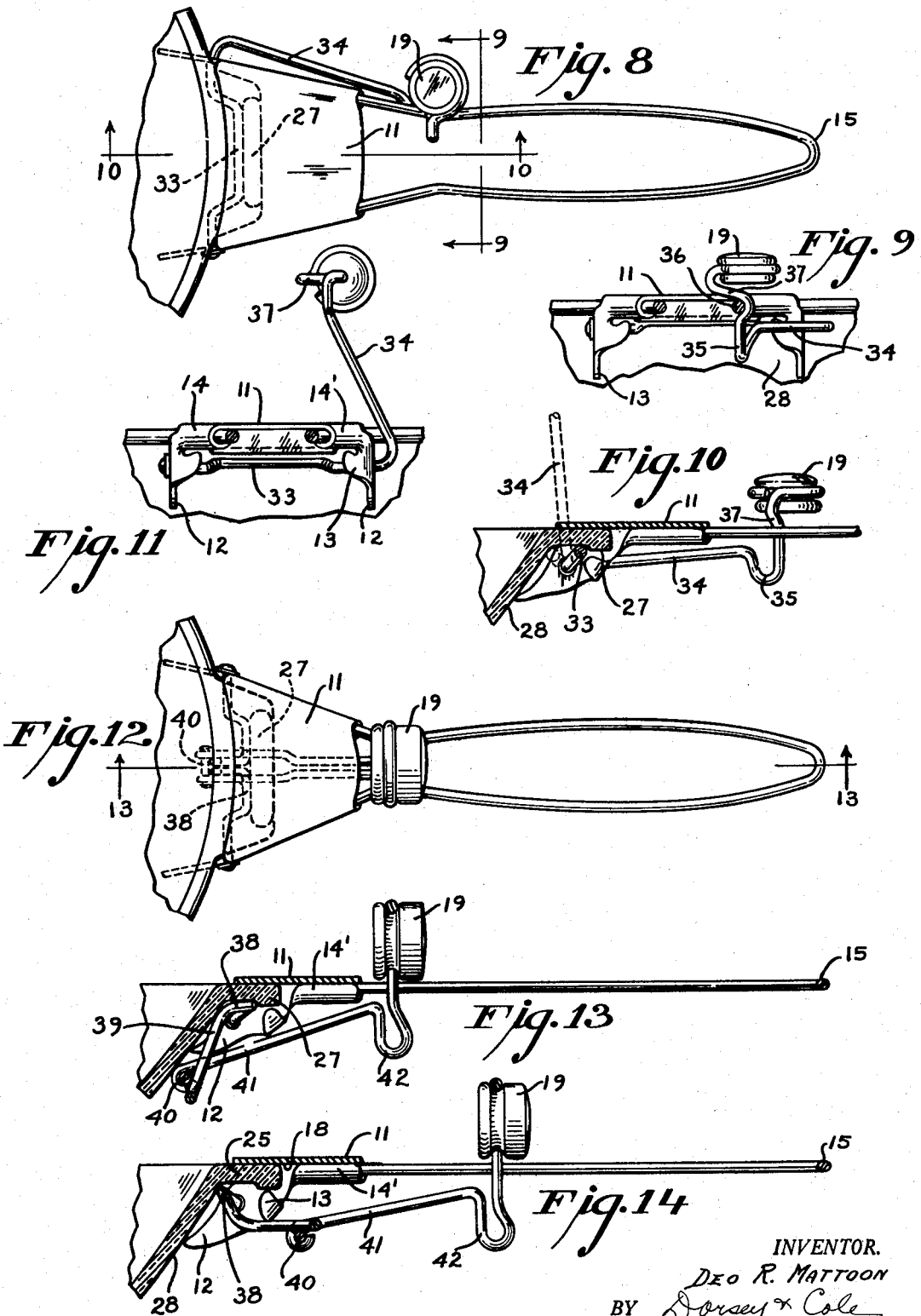
INVENTOR.
DEO R. MATTOON
BY Dorsey & Cole
ATTORNEYS.

Patented June 20, 1939

2,162,961

UNITED STATES PATENT OFFICE 2,162,961

COOKING UTENSIL HANDLE

Deo R. Mattoon, Corning, N. Y., assignor to Corning Glass Works, Corning, N. Y., a corporation of New York Application October 6, 1936, Serial No. 104,268

8 Claims. (Cl. 16—114)

The present invention relates to cooking utensils, and particularly to glass cooking utensils provided with detachable handles.

An object of the present invention is a glass cooking utensil having improved handling facilities.

Features of the invention comprise the provision of a glass cooking utensil and various forms of compact and simple handles by means of any one of which the glass cooking utensil may be seized and thereafter handled with the same facility as are ordinary cooking utensils having handles permanently fixed thereto.

More specifically, features of the invention embody a glass vessel provided with a lug designed for seizure by the jaws of a detachable handle which greatly facilitates the handling of the vessel.

In the drawings:

Fig. 1 is a perspective view of a glass vessel and handle assembly embodying the invention;

Fig. 2 is an enlarged top plan view of the handle and a fragment of the vessel;

Fig. 3 is a sectional elevation taken on line 3—3 of Fig. 2;

Fig. 4 is an enlarged bottom plan view of the handle and a fragment of the vessel;

Fig. 5 is a sectional elevation taken on line 5—5 of Fig. 2;

Fig. 6 is similar to Fig. 5, but with the movable jaw thereof in the released position.

Fig. 7 is a view similar to Fig. 3 illustrating a modified embodiment of the invention;

Fig. 8 is a view similar to Fig. 2 illustrating a further modified embodiment of the invention;

Fig. 9 is a sectional elevation taken on line 9—9 of Fig. 8;

Fig. 10 is a sectional elevation taken on line 10—10 of Fig. 8;

Fig. 11 is a view similar to Fig. 9, but with the movable jaw thereof in the released position;

Fig. 12 is a view similar to Fig. 8 of a further modified embodiment of the invention;

Fig. 13 is a sectional elevation taken on line 13—13 of Fig. 12; and

Fig. 14 is a view similar to Fig. 13, but with the movable jaw thereof in its released position.

Similar numerals designate similar parts throughout the drawings.

The handle assembly, illustrated in Figs. 1 to 6 inclusive, is composed of a sheet metal stamping 11 having integral therewith downwardly projecting vessel supporting members 12, lug guide members 13, and handle grip clamping extensions 14 and 14' respectively. The actual grip 15 of the handle comprises a length of stiff wire bent to the configuration of a fork and secured to the sheet metal stamping by bending or folding extensions 14 and 14' over the ends thereof.

The supporting members 12 are pierced to receive axial extensions of a jaw 17 movable with respect to a fixed jaw 18 comprising the oppositely disposed flat under surface of the sheet metal stamping 11. The movement of jaw 17 is accomplished by a button 19 clamped to the end of an extension 20 of the spring steel wire from which the jaw 17 is formed. This extension is so bent so as to form a stop 21 which limits the upward movement of button 19 when the jaw 17 has attained a definite predetermined position with respect to jaw 18. At a point above stop 21 the extension 20 is bent to form a swell 22 which, owing to the springy characteristics of the wire from which the extension 20 and jaw 17 are formed, rides over the folded-over extension 14' (Fig. 5) of the sheet metal stamping coincident with the engagement of the stop 21 with the bottom thereof. The jaw 17 is frictionally locked in this position by the entrance of extension 14' into the channel 23 formed between stop 21 and the swell 22. In pressing the vessels the thickness of lugs 25 may vary somewhat, but this presents no difficulty owing to the yieldable characteristics of the material from which jaw 17 is made.

The vessel with which the handle assembly cooperates is provided with a lug 25 extending horizontally from the upper edge or rim thereof and has integral therewith a boss 27 on its under side.

When it is desired to affix the handle assembly to the vessel the lug 25 is introduced between the jaws 17 and 18, which are sufficiently separated when the button 19 has been moved downward the distance required to bring swell 22 just below extension 14', at which time the jaw 17 is positioned just below the bottom level of lug 27 in alignment with tops of the fixed lug guide members 13. In Fig. 6, the handle assembly has been shown with the fixed jaw arranged over the lug 25 of the vessel and with the movable jaw 17 widely separated therefrom, the extension 20 having been allowed to drop by gravity to the position shown. As the button 19 is raised to the point where swell 22 rides over extension 14', the jaw 17 is gently forced against the back or inner wall of boss 27 and on upwardly against the lug 25, thereby firmly seizing the lug between it and the fixed jaw 18. It will be observed (Fig. 3) that the position of the jaw 17 with respect to its axis of rotation is such that it very effectively resists upward movement of the vessel with respect to the handle, while any sagging action of the vessel with respect to the handle is prevented by engagement of supporting members 12 with the sidewall 28 of the vessel.

To disengage the handle from the vessel the button 19 is pressed downwardly until the swell 22 is brought below the folded-over extension 14' which, as previously explained, brings the jaw 17 below the bottom level of boss 27, thereby freeing the handle from the vessel.

The modified embodiment of the invention illustrated in Fig. 7 is similar to the one already described, except that the fixed jaw 30 has a swell 31 thereon which is cooperative with a suitable detent in the top of lug 32, making the provisions of a boss such as 25 unnecessary. The jaw 17 in this embodiment therefore does not itself directly prevent withdrawal of the handle assembly from the lug owing to the absence of boss 25. Therefore it is preferable to so form the jaw 17 with respect to extension 20 as to cause it to assume substantially the vertical position, as illustrated, when in seized relation to the lug 32.

In the embodiment illustrated in Figs. 8 to 11, the movable jaw 33 is so located with respect to its operating extension 34 that in the released or open position the jaw 33 is extended toward the vessel (Fig. 11). To affix the handle to the vessel the extension 34 is moved downwardly toward the handle grip 15, so that the jaw 33 is rotated clockwise, having reference to Fig. 10. The half-loop portion 35 of extension 34 is bent to frictionally engage the outside edge of the associated wire of the hand grip 15 as the extension 34 is being lowered, while the portion 37 thereof stops the rotation of the movable jaw 33 just after it has been brought into engagement with the bottom side of lug 25 and has been forced against the inner side of boss 27, thereby not only tightly seizing the lug 25 but also drawing the entire handle assembly toward the vessel.

In the embodiment illustrated in Figs. 12 to 14, a movable jaw 38 has a centrally disposed extension 39 to which a transversely arranged pin 40 is spot welded and upon which is pivoted a jaw operating extension 41. The extension 41 has formed on the free end thereof a trigger 42 and then continues upwardly thru the hand grip 15 where it encircles the operating button 19 and rests on the two sides of the hand grip.

The jaw 38 in its released or open position is extended toward the vessel (Fig. 14) so that the lug 25 may be introduced between it and the fixed jaw 18. By pushing the button 19 toward the vessel, the jaw 38 is rotated clock-wise, having reference to Fig. 14, first against lug 25 and then into engagement with the inner wall of boss 27, thereby drawing the entire handle toward the vessel.

Release of the handle is accomplished by pulling the extension 41 to the released position (Fig. 14) and this may most readily be done by pulling back on the trigger 42.

While the embodiment of the invention illustrated in Fig. 7 has been applied to the particular form of structure covered by Figs. 1–6, it will be evident that such embodiment may be likewise applied to the other embodiments herein disclosed without departing from the spirit and scope of the invention.

I claim:

1. In a detachable handle for vessels, a jaw fixed with respect to the handle and adapted for engagement with a top edge portion of a vessel, members depending from opposite sides of said jaw and in fixed relation thereto for engagement with the sidewall of a vessel, a movable jaw pivoted in said members in cooperative relation with said fixed jaw to engage the bottom side of the portion of the edge of the vessel the top side of which is engaged by said fixed jaw, and an extended portion of said movable jaw cooperative with an intermediate portion of the handle to hold the edge of a vessel firmly between said jaws.

2. In a detachable handle for vessels, a length of wire folded at the center to form a forked handle member, a sheet-metal member having oppositely disposed edges folded over the ends of said wire and having downwardly and forwardly extended portions for engagement with the adjacent sidewall of a vessel, a clamping member pivoted in said downwardly and forwardly extended portions and cooperative with a horizontal portion of said sheet-metal member for clamping a projecting edge of a vessel therebetween, and an extension of said clamping member cooperative with an intermediate point of the handle to lock said clamping member in one of its positions.

3. A detachable handle for vessels comprising a length of wire bent to form a forked member to produce a handle proper at its closed end, a sheet metal member bridged across the open end of said member, downwardly extending portions of said sheet metal member having a clamping member pivoted therein, an operating member for said clamping member arranged in cooperative relation with the handle to lock said clamping member in position to seize an edge of a vessel between it and an under surface of said sheet metal member, and extensions of said downwardly extending portions for engagement with the sidewall of a vessel seized to prevent a downward swinging movement of the handle as a whole relative to the vessel.

4. In a detachable handle for vessels, a wire bent to form a longitudinal loop having one end closed and the ends of the wire terminating the open end of the loop being bent away from each other, a sheet metal member securely fixed to the ends of the wire and for the most part arranged in a plane parallel to said wire, a clamping element pivoted to portions of said member and having an extension in locking relation with another portion of said member and which when in such locking relation is in a position to seize an edge of a vessel between it and a portion of said member, and other portions of said member for engagement with the outer sidewall of a seized vessel to hold the vessel braced against movement downward with respect to the handle.

5. In a detachable handle for vessels, a length of relatively stiff wire folded to form a handle member, a sheet metal member oppositely disposed edges of which are folded over the ends of said wire and having extending portions for guiding the handle into cooperating relation with the vessel with which it is to be used, other portions of said member for engagement with the sidewall of such vessel to assist in its support, and a second wire pivoted in portions of said member with one part thereof arranged to cooperate with a portion of said member to pinch the lug between it and said member and the other part serving as an operating and locking lever for performing the pinching and locking operations.

6. In a detachable handle for vessels, a jaw fixed with respect to the handle and adapted for engagement with a top edge portion of a vessel, members depending from opposite sides of said jaw and in fixed relation thereto for engagement with the sidewall of a vessel, a movable jaw pivoted in said members in cooperative relation with said fixed jaw to engage the bottom side of the portion of the edge of the vessel the top side of which is engaged by said fixed jaw, and means operable in a plane parallel to the top surface of the handle for actuating said movable jaw.

7. A handle for a vessel having a projecting lug extending laterally from a portion of its rim with a boss on the undersurface of the lug, said handle comprising a first element which at least in part covers the top surface of the lug and portions of which extend down adjacent the outer wall surface of the vessel proper, and a second element pivoted to the first element and adapted to exert a force against the boss in such direction as to draw the portions extending downwardly from said first element snugly against the sidewall surface of the vessel.

8. A handle for a vessel having a projecting lug extending laterally from a portion of its rim with a boss on the undersurface of the lug, said handle comprising a first element which at least in part covers the top surface of the lug and portions of which extend down adjacent the outer wall surface of the vessel proper, and a second element pivoted to the first element adapted to exert a force against the undersurface of the lug and an adjoining surface of the boss so as to draw the first element snugly against the top surface of the lug and the portions extending downwardly from said first element against the sidewall surface of the vessel.

DEO R. MATTOON.